Feb. 21, 1933.  C. C. FARMER  1,898,529
SPRING TESTER
Filed June 1, 1929
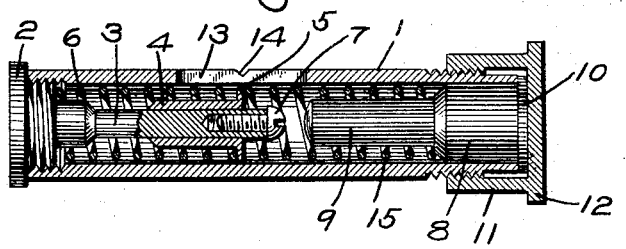
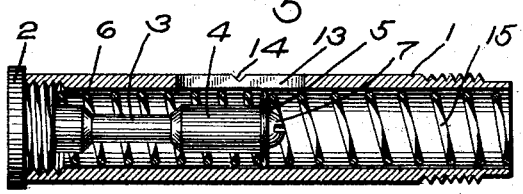 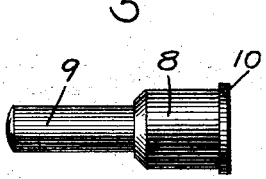 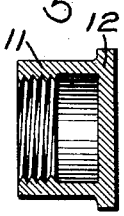
INVENTOR
CLYDE C. FARMER
BY *Wm. M. Cady*
ATTORNEY Patented Feb. 21, 1933

1,898,529

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

SPRING TESTER

Application filed June 1, 1929. Serial No. 367,792.

This invention relates to a spring testing device, and has for its principal object to provide a device for testing a spring to determine whether the spring has a predetermined compression value.

In the accompanying drawing; Figure 1 is a sectional view of a spring testing device embodying my invention; Fig. 2 a sectional view of the spring testing device shown in Fig. 1, with the plunger and compression cap removed; Fig. 3 an elevational view of the plunger; and Fig. 4 a sectional view of the compression cap.

As shown in the drawing, the spring testing device may comprise a barrel 1 having one end closed by a screw threaded plug 2. Said plug carries a stem 3 and slidably mounted on said stem is a sleeve 4, provided at one end with a flange 5, or other element adapted to be employed as an indicator.

Interposed between the inner face of the plug 2 and the flange 5 is a calibrated spring 6, with which the spring to be tested is to be compared. A headed screw 7 may be screwed into the outer end of the stem 3 to maintain the sleeve 4 and the spring 6 assembled in the device.

A plunger is provided comprising a cylindrical section 8 adapted to slidably engage in the bore of the barrel 1, a cylindrical section 9 of reduced diameter, and a head section 10. A compression cap 11 is also provided which is interiorly threaded for screw threaded engagement with the barrel 1 and said cap is provided with a head 12, having its periphery knurled.

A view opening or slot 13 is provided in the barrel, which is so positioned that the flange 5 may be viewed, and a notch 14 is provided for indicating purposes.

In operation, the plunger and the compression cap 11 having been removed from the testing device, the spring 15 to be tested is inserted in the bore of the barrel 1, so that the inner end of the spring engages the flange 5, as shown in Fig. 2. The plunger is then introduced into the barrel, the shoulder formed between the sections 9 and 8 engaging the outer end of the spring 15, and the section 9 serving as a guide for the spring.

The compression cap 11 is then applied and is screwed down, so as to compress the spring, by rotating the knurled head 12, until the head 10 engages the end wall of the barrel 1.

Both springs 6 and 15 are compressed by this movement of the plunger and if the compression value of a spring 15 is equal to that of the calibrated spring 6, then both springs will be equally compressed, and the flange 5 will take a position in line with the notch 14, thus indicating that the spring to be tested has the correct value.

If the spring 15 to be tested does not have the correct value, the flange or indicator 5 will take a position at either one side or the other of the notch 14, thus indicating that the spring is not of the proper compression value.

The calibrated spring 6 is so installed that it cannot be stretched or strained unless the device is completely disassembled.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A spring testing device comprising a barrel having an indicating mark, a calibrated spring mounted in said barrel, an indicating element mounted in said barrel and engaging one end of said spring, and means mounted in said barrel for applying pressure to the spring to be tested, which is interposed between said indicating element and said means, to thereby compress both springs, said element moving to register with the mark on the barrel when the compressive value of the spring to be tested is equal to the compressive value of the calibrated spring.

2. A spring testing device comprising a barrel having a chamber adapted to receive the spring to be tested, a calibrated spring mounted in said barrel, an indicating element mounted in said barrel and engaging one end of said calibrated spring, and means mounted in said barrel for applying pressure to compress both springs, the spring to be tested being disposed between said indicating element and said means, the barrel having an indicating mark so positioned that when the compressive value of the spring to be tested is equal to the compressive value of the calibrated spring, the indicating element will register with said indicating mark.

In testimony whereof I have hereunto set my hand this 14th day of May, 1929.

CLYDE C. FARMER.